(12) United States Patent
Magyar

(10) Patent No.: US 6,742,669 B2
(45) Date of Patent: Jun. 1, 2004

(54) REINFORCED TANK

(75) Inventor: Georges Magyar, Dijon Cédex (FR)

(73) Assignee: Etablissements Magyar S.A. (FR)

( * ) Notice: Subject to any disclaimer, the term of this patent is extended or adjusted under 35 U.S.C. 154(b) by 0 days.

(21) Appl. No.: 10/435,186

(22) Filed: May 9, 2003

(65) Prior Publication Data

US 2003/0230584 A1 Dec. 18, 2003

(30) Foreign Application Priority Data

May 24, 2002 (FR) ............................................. 02 06367

(51) Int. Cl.$^7$ ................................................ B65D 90/24
(52) U.S. Cl. ....................................................... 220/654
(58) Field of Search ................................. 220/654, 677, 220/678, 679, 612

(56) References Cited

U.S. PATENT DOCUMENTS

| | | | | | |
|---|---|---|---|---|---|
| 1,807,394 | A | * | 5/1931 | Dunham | ................... 220/567.3 |
| 2,754,993 | A | * | 7/1956 | Maker | ......................... 220/654 |
| 2,781,935 | A | * | 2/1957 | Spieth et al. | ............... 220/4.15 |
| 3,929,249 | A | * | 12/1975 | Sheppard | .................... 220/654 |
| 6,167,608 | B1 | * | 1/2001 | Burwell et al. | ................ 29/450 |

FOREIGN PATENT DOCUMENTS

| | | |
|---|---|---|
| DE | 809 710 C | 8/1951 |
| DE | 30 26 116 A | 2/1982 |
| GB | 1125076 A | 8/1968 |
| NL | 8 300 434 A | 9/1984 |

* cited by examiner

*Primary Examiner*—Joseph Man-Fu Moy
(74) *Attorney, Agent, or Firm*—Piper Rudnick LLP

(57) ABSTRACT

The invention pertains to a tank formed by a partially cylindrical body extended by a cylindrical part of smaller section by the intermediary of a tapering junction section, with a reinforcement ring located at the junction between at least one of the cylindrical parts and the tapering part, the ring having a machined interior surface to correspond over half of its width with the form of the exterior surface of the end of the cylindrical part and over the other half of its width with the form of the exterior surface of the end of the tapering part.

8 Claims, 1 Drawing Sheet

REINFORCED TANK

RELATED APPLICATION

This application claims priority of French Patent Application No. 02/06367, filed May 24, 2002.

FIELD OF THE INVENTION

This invention pertains to the field of tanks, notably, but not exclusively, the field of highway tank semitrailers or storage tanks for liquids or powders used horizontally.

BACKGROUND

Tanks, particularly tank semitrailers, usually have a cylindrical body providing the bulk of the useful volume. This tank body is extended in its front part by an extension of smaller section intended to free up the space for the hitch with the tractor.

The connection of the body of the tank with the extension is implemented by welding different elements of variable section. The connection between the tank body and the tapered extension providing the link with the cylindrical extension is manifested as a fragility zone which can generate breaks in the joint weld.

It would therefore be advantageous to resolve the drawbacks described above by providing a reinforced tank.

SUMMARY OF THE INVENTION

This invention relates to a tank including a substantially cylindrical body, a substantially cylindrical part having smaller section than the substantially cylindrical body, a tapering junction part connected between the substantially cylindrical body and the substantially cylindrical part, and a reinforcement ring located at a junction between at least one of the substantially cylindrical body and the substantially cylindrical part and the tapering junction part, the ring having an interior surface partially shaped to correspond with an exterior surface of an end of the cylindrical part or cylindrical body and partially shaped to correspond with an exterior surface of an end of the tapering junction part.

BRIEF DESCRIPTION OF THE INVENTION

Better comprehension of the invention will be obtained from the description below which refers to a nonlimitative example of implementation with reference to the attached drawings in which.

DETAILED DESCRIPTION

Figure 1:
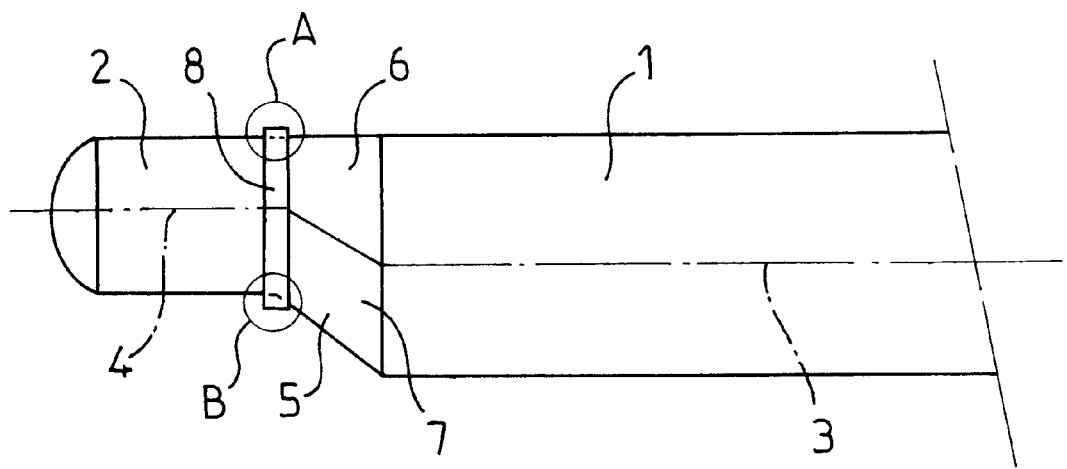
FIG. 1 is a side view of a tank according to aspects of the invention.

It will be appreciated that the following description is intended to refer to specific embodiments of the invention selected for illustration in the drawings and is not intended to define or limit the invention, other than in the appended claims.

The invention pertains in its broadest meaning to a tank formed by a partially substantially cylindrical body extended by a substantially cylindrical part of smaller section by the intermediary of a tapering junction section, comprising a reinforcement ring located at the junction between at least one of the cylindrical parts and the tapering part, the ring having a machined interior surface to correspond over about half of its width with the form of the exterior surface of the end of the cylindrical part and over the other half of its width with the form of the exterior surface of the end of the tapering part.

The ring advantageously has in its top part an annular interior surface and in its bottom part a section having a partially cylindrical and partially oblique surface.

According to one particular mode of implementation, the width of the ring is comprised between about 50 and about 150 millimeters, preferably between about 70 and about 100 millimeters. According to an advantageous variant, the cylindrical and tapering parts are fitted inside the ring over several millimeters.

The ring is preferably welded on the cylindrical and tapering parts by an interior weld bead. The ring is welded on the cylindrical and tapering extensions by exterior weld beads. According to a variant, the axes of the two cylindrical parts are substantiallycoplanar in a vertical plane. According to a variant, the axes of the two cylindrical parts are substantially parallel.

Turning to the drawings, FIG. 1 is a side view of a semitrailer tank constituted of a substantially cylindrical tank body (1) having a section of about 2.5 m. This tank body is extended at its front part by a straight substantially cylindrical part (2) of smaller section, on the order of about 1 m.

The axis of symmetry (3) of the cylindrical body (1) is offset in relation to the axis of symmetry (4) of the cylindrical part (2). In the example shown in FIG. 1, the axis of symmetry (3) of the cylindrical body (1) is substantially parallel to the axis of symmetry (4) of the cylindrical part (2), with the two axes being in a vertical plane and the axis of symmetry (4) of the cylindrical part (2) being offset upwards in relation to the axis of symmetry (3) of the cylindrical body (1).

This arrangement frees up the space required for hitching the trailer below the cylindrical part (2) of smaller section.

The connection between the two straight cylindrical parts (1, 2) is implemented by a junction piece (5) of tapering form. This junction piece (5) has a base of substantially circular section in the example described, having a section substantially identical to that of the tank body (1) and an opposite base of section substantially identical to that of the cylindrical part (2).

These two bases are connected by an envelope having in its semitubular top part (6) a curved form and in its bottom part (7) a semiconical form.

The junction between the front base and the cylindrical part (2) is reinforced by an exterior ring (8) encircling the junction zone. This ring (8) has a width of about several centimeters and a thickness of about several millimeters. It is welded by a median interior weld bead (10) over the assembly of its interior periphery and by two lateral exterior weld beads (11, 12) supported on the lateral fields of the ring (8) and on the adjacent surface, respectively, of the cylindrical part (2) and the tapering extension (5).

Figure 2:
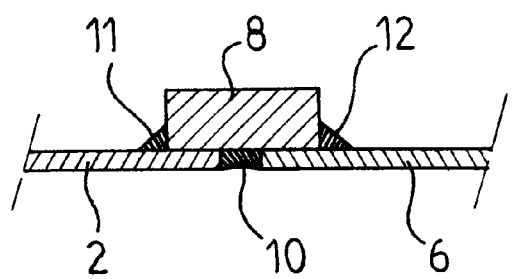
FIG. 2 is a detail view along section A from FIG. 1.
Figure 3:
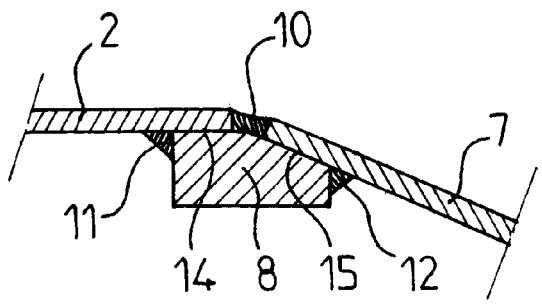
FIG. 3 is a detail view along section B from FIG. 1.

As shown in FIGS. 2 and 3, the ring (8) has a nonsymmetrical internal surface. This surface is tubular in the top part and forms a straight semicylinder. The section in this top part is rectangular over a part forming an arc of about 180°.

In the bottom part, the ring has an interior surface having a trapezoidal section. The front half (14) is of straight cylindrical form; the rear half (15) has a tapering form that is complementary with the junction zone with the extension (5).

The ring has an interior surface complementary with the junction zone overlapping the junction line between the straight cylindrical part (2) and the extension (5).

The invention is not limited to tanks of circular section but pertains as well to tanks having one or more parts of elliptical or other section.

The axes of the cylindrical body (1) and the cylindrical part (2) are not necessarily parallel but can form an angle while being coplanar in a vertical plane.

What is claimed is:

1. A tank comprising:

a substantially cylindrical body;

a substantially cylindrical part having smaller section than the substantially cylindrical body;

a tapering junction part connected between the substantially cylindrical body and the substantially cylindrical part; and a reinforcement ring located at a junction between at least one of the substantially cylindrical body and the substantially cylindrical part and the tapering junction part, said ring having an interior surface partially shaped to correspond with an exterior surface of an end of the cylindrical part or cylindrical body and partially shaped to correspond with an exterior surface of an end of the tapering junction part.

2. The tank according to claim 1, wherein the ring has a top part with an annular interior surface and a bottom part with a section having a partially substantially cylindrical and partially oblique surface.

3. The tank according to claim 1, wherein the width of the ring is between about 50 and about 150 millimeters.

4. The tank according to claim 3, wherein the substantially cylindrical and tapering parts are fitted inside the ring over a distance of about several millimeters.

5. The tank according to claim 1, wherein the ring is welded on the substantially cylindrical and tapering parts by an interior weld bead.

6. The tank according to claim 1, wherein the ring is welded on the substantially cylindrical and tapering parts by exterior weld beads.

7. The tank according to claim 1, wherein longitudinal axes extending along the substantially cylindrical part and body are substantially coplanar in a vertical plane.

8. The tank according to claim 1, wherein longitudinal axes extending along the substantially cylindrical body and part are substantially parallel.

* * * * *